US009128627B1

(12) United States Patent
Bachu et al.

(10) Patent No.: US 9,128,627 B1
(45) Date of Patent: Sep. 8, 2015

(54) METHOD AND SYSTEM FOR VIRTUAL MACHINE BACKUP

(71) Applicant: EMC Corporation, Hopkinton, MA (US)

(72) Inventors: Kiran Bachu, Cupertino, CA (US); Vladimir Mandic, San Jose, CA (US); Scott H. Ogata, Lake Forest, CA (US)

(73) Assignee: EMC CORPORATION, Hopkinton, MA (US)

( * ) Notice: Subject to any disclaimer, the term of this patent is extended or adjusted under 35 U.S.C. 154(b) by 252 days.

(21) Appl. No.: 13/886,897

(22) Filed: May 3, 2013

(51) Int. Cl.
*G06F 12/00* (2006.01)
*G06F 3/06* (2006.01)
*G06F 11/14* (2006.01)

(52) U.S. Cl.
CPC .............. *G06F 3/0641* (2013.01); *G06F 3/065* (2013.01); *G06F 11/1456* (2013.01)

(58) Field of Classification Search
None
See application file for complete search history.

(56) References Cited

U.S. PATENT DOCUMENTS

| 8,850,455 | B1 * | 9/2014 | Bachu et al. ................. 719/313 |
| 2011/0010515 | A1 * | 1/2011 | Ranade ......................... 711/162 |
| 2012/0102135 | A1 * | 4/2012 | Srinivasan et al. ............. 709/213 |
| 2013/0290958 | A1 * | 10/2013 | Ansel ............................... 718/1 |

\* cited by examiner

*Primary Examiner* — Brian Peugh
(74) *Attorney, Agent, or Firm* — Dergosits & Noah LLP; Todd A. Noah

(57) ABSTRACT

Virtual machine backup is described. A backup copy is created of a data set associated with a virtual machine based on a backup schedule. A clone copy is created of the backup copy based on a clone schedule. The clone copy is stored on an external destination node including a disk and/or a tape. A disaster recovery copy may be created of the backup copy and metadata associated with the backup copy based on a checkpoint at an interval. A request to restore the data set may be received. The data set may be restored based on the backup copy, the clone copy, or the disaster recovery copy.

20 Claims, 3 Drawing Sheets

300

Create backup copy of data set associated with virtual machine based on backup schedule.
302

Create clone copy of backup copy based on clone schedule.
304

Store clone copy on external destination node including disk and/or tape.
306

Create disaster recovery copy of backup copy and metadata associated with backup copy based on checkpoint at interval.
308

Receive request to restore data set.
310

Restore data set based on backup copy, clone copy, or disaster recovery copy.
312

METHOD AND SYSTEM FOR VIRTUAL MACHINE BACKUP

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore a copy of the corresponding backup files for that state to the database. An additional copy that is made of the copy of the backup files and stored separately from the backup files may be referred to as a clone copy of the backup files.

A virtual machine is a software implementation of a computer that executes programs like a physical machine. A system virtual machine provides a complete system platform that supports the execution of a complete operating system, and usually emulates an existing architecture. Multiple instances of virtual machines lead to more efficient use of computing resources, both in terms of energy consumption and cost effectiveness, known as hardware virtualization, the key to a cloud computing environment. Similar to other databases, backup copies are made of virtual machine databases to enable a restoration of the virtual machine database in the event of corruption or an erroneous update to the virtual machine database.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

In the prior art, a virtual machine backup tool can create a backup copy of a virtual machine database, but the backup copy may be lost if the virtual machine backup tool and/or the backup copy was corrupted. Furthermore, many virtual machine backup tools may be limited to the use of only a small number of internal proxy agents that can execute data protection tasks for virtual machine databases because many virtual machine backup tools have a limited storage capacity.

Embodiments herein provide virtual machine backup. A backup copy is created of a data set associated with a virtual machine based on a backup schedule. For example, a virtual machine backup appliance creates and stores a backup copy of a virtual machine's data set whenever a specified amount of modifications have been made to the data set. A clone copy is created of the backup copy based on a clone schedule. For example, the virtual machine backup appliance periodically creates a clone copy of the backup copy. The clone copy is stored on an external destination node including a disk and/or a tape. For example, the virtual machine backup appliance stores the clone copy on an external disk, thereby protecting a copy of the data set even if the virtual machine backup appliance and/or the backup copy of the data set are corrupted. A disaster recovery copy may be created of the backup copy and metadata associated with the backup copy based on a checkpoint at an interval. For example, a disaster recovery copy is made of the backup copy based on checkpoints at regular intervals. A request to restore the data set may be received. For example, the virtual machine backup appliance receives a request to restore the data set to the virtual machine. The data set may be restored based on the backup copy, the clone copy, or the disaster recovery copy. For example, the virtual machine backup appliance restores the data set to the virtual machine from either the backup copy, the clone copy, or the disaster recovery copy, depending on the availability and creation time of each copy. The virtual machine backup appliance provides full enterprise level protection of data for all of an enterprise's virtual machines.

Figure 1:
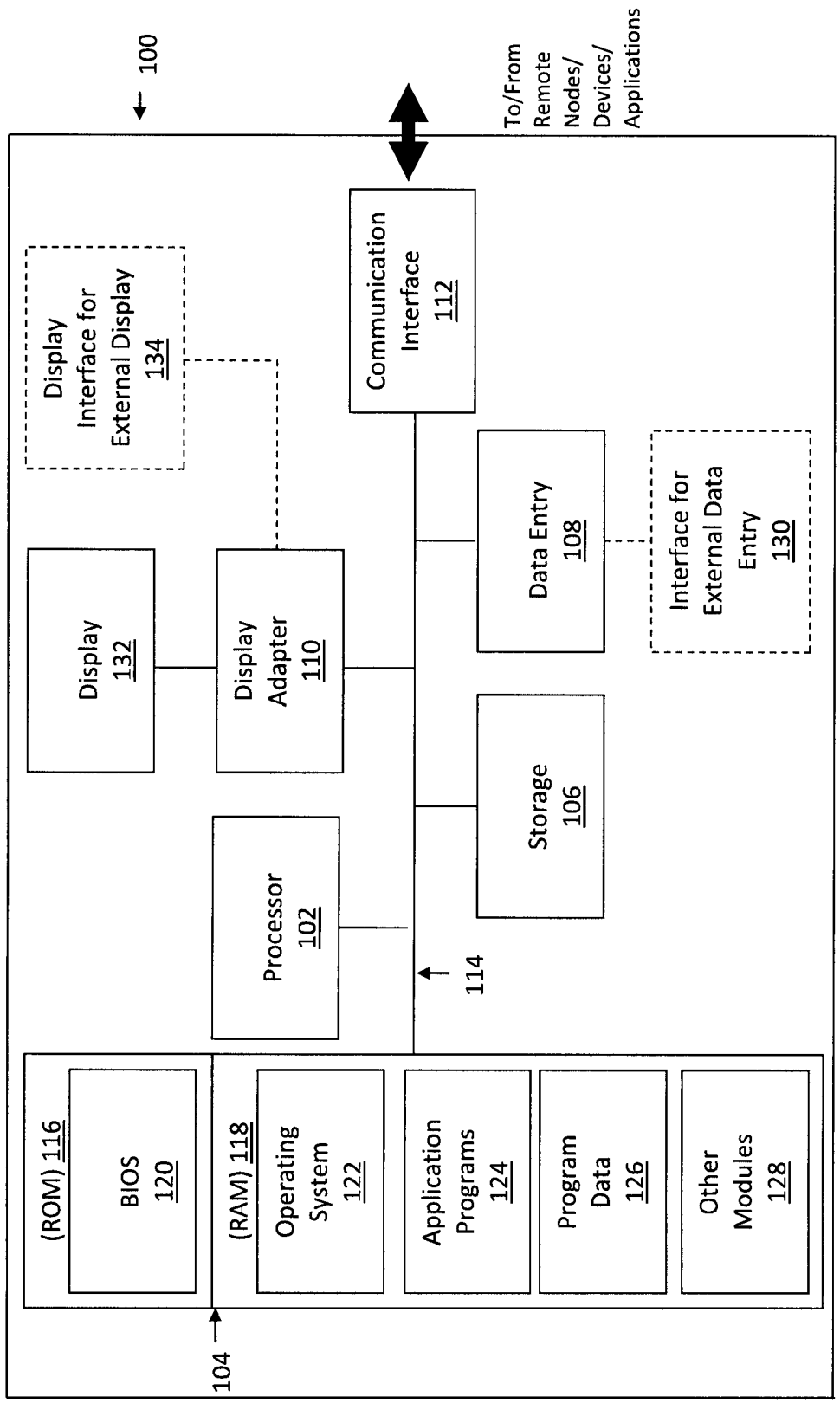
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for a data protection policy generator.

In the prior art, a backup copy of a virtual machine's data set may be lost if the virtual machine backup tool and/or the backup copy was corrupted. Embodiments herein provide virtual machine backup.

Figure 2:
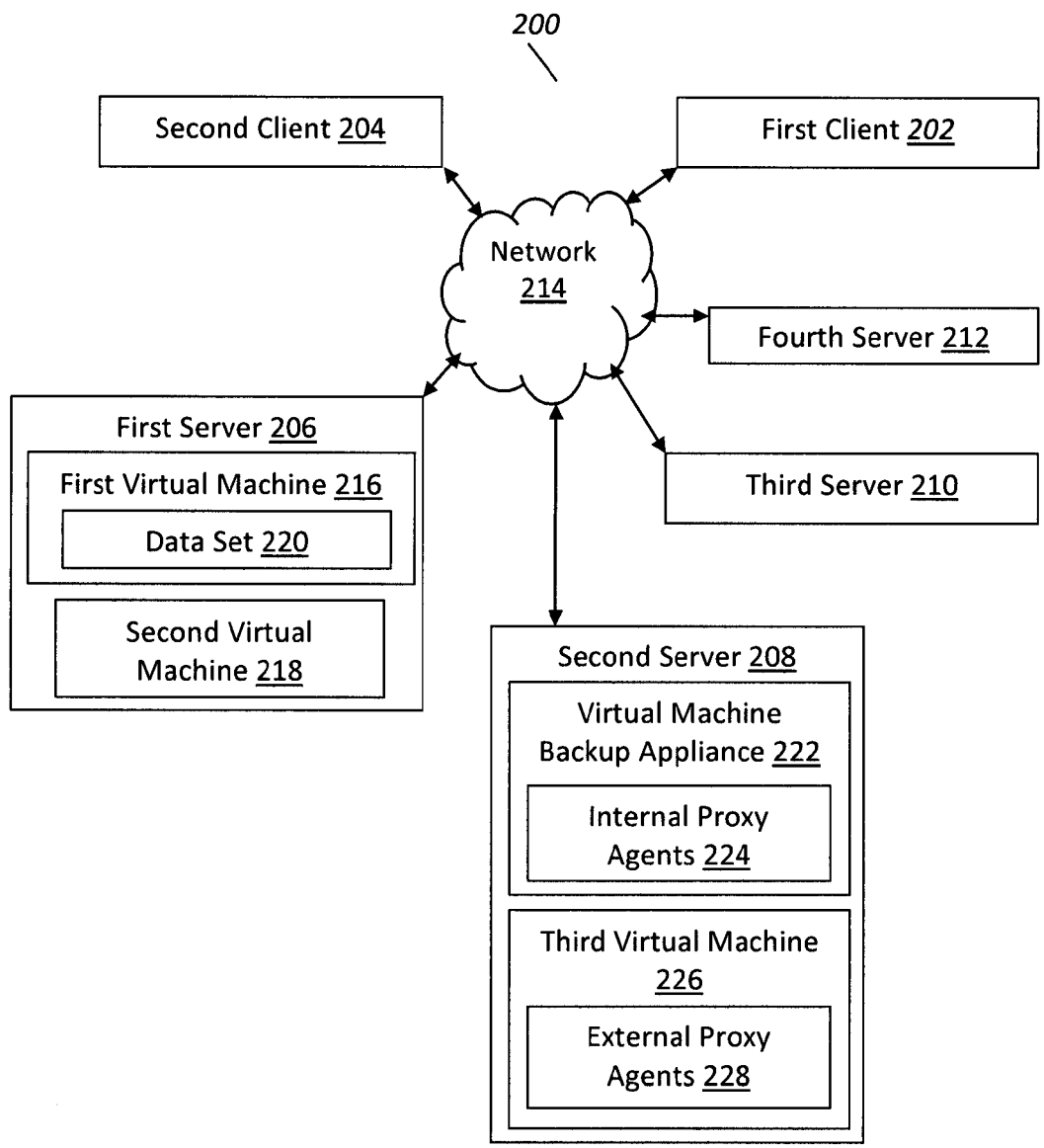
FIG. 2 illustrates a block diagram of an example system for virtual machine backup, under an embodiment.

FIG. 2 illustrates a block diagram of a system that implements virtual machine backup, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, a third server 210, and a fourth server 212 that are provided by a hosting company. The clients 202-204 and the servers 206-212 communicate via a network 214. Although FIG. 2 depicts the system 200 with two clients 202-204, four servers 206-212, and one network 214, the system 200 may include any number of clients 202-204, servers 206-212, and networks 214. The clients 202-204 and the servers 206-212 may each be substantially similar to the system 100 depicted in FIG. 1.

The first server 206 includes a first virtual machine 216 and a second virtual machine 218. The first virtual machine includes a data set 220. The second server 208 includes a virtual machine backup appliance 222, and may include a third virtual machine 226. The virtual machine backup appliance 222 may also be a virtual machine. The virtual machine backup appliance 222 includes internal proxy agents 224 and supports external proxy agents 228, which are internal proxy agents for the third virtual machine 226. FIG. 2 depicts the system elements 216-220 residing completely on the first server 206 with the system elements 222-228 residing completely on the second server 208. However, the system elements 216-228 may reside completely on the first server 206, completely on the second server 208, or in any combination of partially on the first server 206, partially on the second server 208, partially on the third server 210, and partially on the fourth server 212.

A data protection administrator uses the first client 202 to instruct the virtual machine backup appliance 222 to protect the data set 220 used by the first virtual machine 216, which is accessed by a user via the second client 204 and provided by the first server 206, by storing various copies of the data set 220 on the servers 208-212.

The virtual machine backup appliance 222 receives a selection from the first client 202 to protect the data set 220 accessed by the second client 204 via the first virtual machine 216 in the first server 206. For example, the virtual machine backup appliance 222 receives a selection to create a backup copy of the data set 220 in the first server 206, and store the backup copy via the second server 208, based on a backup schedule. The first source, such as the first server 206, may include multiple source nodes. For example, the first virtual machine 216 may store the data set 220 on a disk associated with the first server 206. A data protection administrator may use the virtual machine backup appliance 222 to specify a query for data sets, and identify the response to the query as the data set to be copied. The first destination, such as the second server 208, may include multiple destination nodes, and the multiple destination nodes may include a disk destination node, a tape destination node, and/or a destination node that is a combination of disks and tapes. For example, one of the internal proxy agents 224 or one of the external proxy agents 228 may store the backup copy of the data set 220 on a disk, on a tape, or partly on a disk and partly on a tape associated with the second server 208.

In the prior art, many virtual machine backup tool may be limited to a small number of internal proxy agents due to limitations on the size of the code that provides the virtual machine backup tool, which means that the virtual machine backup tool is limited to executing a small number of concurrent data protection tasks. The virtual machine backup appliance 222 is deployed as a downloadable open virtualization appliance file, a single compressed file that contains an operating system image, packages, boot scripts, etc. While this deployment limitation on code size also limits the virtual machine backup appliance 222 to a small number of the internal proxy agents 224, the virtual machine backup appliance 222 may also support an unlimited number of the external proxy agents 228. The external proxy agents 228 are deployed as part of the third virtual machine 226, which is also a downloadable open virtualization appliance file, which can be deployed and registered with the virtual machine backup appliance 222, such that the external proxy agents 228 may be added to the available proxy agent pool for the virtual machine backup appliance 222.

A data protection administrator may use the virtual machine backup appliance 222 to specify a priority for storing copies of data on destination nodes, such as storing only on disks, or storing on disks before storing on a combination of disks and tapes. Additionally, a data protection administrator may use the virtual machine backup appliance 220 to specify the options for data to be encrypted, deduplicated, and/or compressed while being transmitted from a source, and the options for data to be decrypted and/or decompressed when stored on a destination. Data deduplication significantly reduces backup time by only storing unique daily changes, while always maintaining daily full backups for immediate single-step restore. The transmission of deduplicated backup sends only changed blocks, thereby reducing network traffic.

A backup application may receive a selection from the first client 202 to protect the data set 220 accessed by the second client 204 via the first virtual machine 216 in the first server 206. For example, a NetWorker® backup application receives a selection to create a clone copy of the data set 220 from a second source, the second server 208, and store the clone copy in the second destination, the third server 210, based on a clone schedule. The second source may include multiple source nodes, and the multiple source nodes may include a disk source node, a tape source node, and/or a source node that is a combination of disks and tapes. For example, the second server 208 may store the backup copy of the data set 220 on a disk, on a tape, or partly on a disk and partly on a tape. Similarly, the second destination may include multiple destination nodes, and the multiple destination nodes may include a disk destination node, a tape destination node, and/ or a destination node that is a combination of disks and tapes. For example, one of the internal proxy agents 224 or one of the external proxy agents 228 may store the clone copy of the data set 220 on a disk, on a tape, or partly on a disk and partly on a tape associated with the third server 210.

EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker@ management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. The virtual machine backup appliance 222 may be deployed as a module that plugs into the NetWorker® backup application, which a data protection administrator may access to monitor and control any number of virtual machine backup appliances 222. The capability of monitoring and controlling any number of virtual machine backup appliances 222, combined with the capability of each virtual machine backup appliance 222 to support multiple external proxy agents 226 provides the NetWorker® backup application with the capacity to offer full enterprise level protection of data for all of an enterprise's virtual machines.

The virtual machine backup appliance 222 may receive an additional selection to protect the data set 220 accessed by the second client 204 via the first virtual machine 216 in the first server 206. For example, the virtual machine backup appliance 222 receives a selection to create a disaster recovery copy of the data set 220 and the associated metadata from the third source, the third server 210, and store the disaster recovery copy in the third destination, the fourth server 212, based on checkpoints at regular intervals. The third source may include multiple source nodes, and the multiple source nodes may include a disk source node, a tape source node, and/or a source node that is a combination of disks and tapes. For example, the third server 210 may store the clone copy of the data set 220 on a disk, on a tape, or partly on a disk and partly on a tape. Similarly, the third destination may include multiple destination nodes, and the multiple destination nodes may include a disk destination node, a tape destination node, and/or a destination node that is a combination of disks and tapes. For example, the Virtual Machine Backup Appliance 222 executing on the second server 208 may store the disaster recovery copy of the data set 220 and the associated metadata on a disk, on a tape, or partly on a disk and partly on a tape associated with the fourth server 212. The disaster recovery copy of the data set 220 may be based on checkpoints that the Virtual Machine Backup Appliance 222 created at regular intervals. The Virtual Machine Backup Appliance 222 automatically rolls back the data set 220 to a certain checkpoint during a power up if the preceding shutdown of the first virtual machine 216 was abnormal. Furthermore, an administrator may select to execute a manual rollback to a certain checkpoint selected by the administrator.

A virtual machine center application is executed by a server, such as the second server 208, to provide a centralized and extensible platform for managing virtual infrastructure. This managing of virtual machine environments enables information technology administrators to have simple and automated control over a virtual environment to deliver infrastructure. A virtual machine center server provides centralized management of virtualized hosts and virtual machines from a single console, and gives administrators visibility into the configuration of all the critical components of a virtual infrastructure, all from one place. With a virtual machine center server, virtual environments are easier to manage, as a single administrator can manage hundreds of workloads, more than doubling typical productivity in managing physical infrastructure. The virtual machine backup appliance 222 is deployed as a module that may plug into the virtual machine center application, which enables the virtual machine backup appliance 222 to access each of the virtual machines monitored and controlled by the virtual machine center application. An administrator may use the virtual machine center application to manually initiate a backup copy and/or a clone copy of a data set via the virtual machine backup appliance 222.

Figure 3:
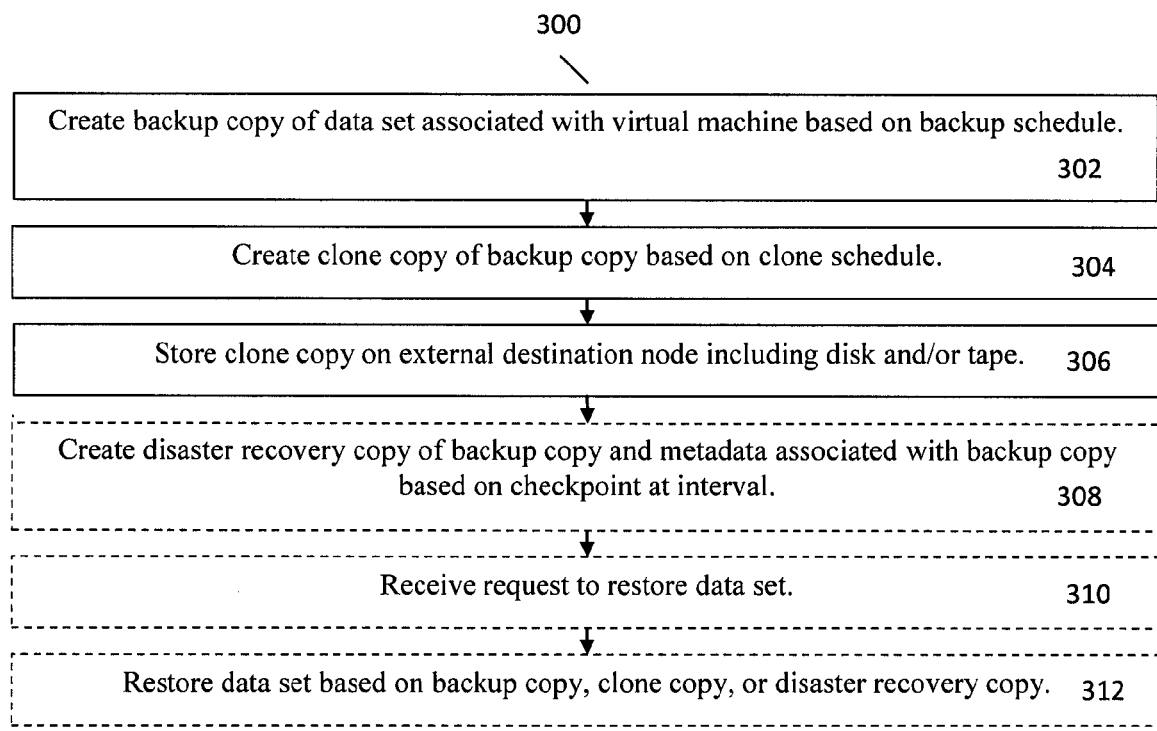
FIG. 3 is a flowchart that illustrates a method of virtual machine backup, under an embodiment.

Data protection administrators may use the virtual machine backup appliance 222 to generate a specific policy based on the specific needs of a customer, and reuse that policy for customers with similar needs. For example, a data protection administrator may use the virtual machine backup appliance 222 to generate a "gold" policy, a "platinum" policy, and a "silver" policy for VMware® clients. The gold policy can specify to store 2 backup copies for each VMware® client onto a first disk for 6 months, store a clone of the backup copies on a second disk for 1 year, and store a secondary clone of the backup copies on a tape for 5 years. In this example, the data protection administrator that used the virtual machine backup appliance 222 to generate the gold policy for a specific set of VMware® clients may later apply another instance of the same gold policy to a different set of VMware® clients. Similarly, the data protection administrator may apply another instance of the same platinum policy to a different set of VMware® clients. The virtual machine backup appliance 222 provides full enterprise level protection of data for all of an enterprise's virtual machines FIG. 3 is a flowchart that illustrates a method of virtual machine backup. Flowchart 300 illustrates method acts illustrated as flowchart blocks for certain steps involved in and/or between the clients 202-204 and/or the servers 206-212 of FIG. 2.

A backup copy is created of a data set associated with a virtual machine based on a backup schedule, act 302. For example, the virtual machine backup appliance 222 creates and stores a backup copy of the data set 220 for the first virtual machine 216 whenever the first virtual machine 216 has made modifications to the data set 220.

A clone copy is created of the backup copy based on a clone schedule, act 304. For example, the virtual machine backup appliance 222 periodically creates a clone copy of the backup copy.

The clone copy is stored on an external destination node including a disk and/or a tape, act 306. For example, the virtual machine backup appliance 222 stores the clone copy on an external disk associated with the third server 210, thereby protecting a copy of the data set 220 even if the virtual machine backup appliance 222 and/or the backup copy of the data set 220 stored on the second server 208 is corrupted.

A disaster recovery copy is optionally created of the backup copy and metadata associated with the backup copy based on a checkpoint at an interval, act 308. For example, the Virtual Machine Backup Appliance 222 makes a disaster recovery copy of the backup copy stored via the second server 208 and stores the disaster recovery copy via the fourth server 212, based on checkpoints at regular intervals.

A request to restore the data set is optionally received, act 310. For example, the virtual machine backup appliance 222 receives a request to restore the data set 220 to the first virtual machine 216.

The data set is optionally restored based on the backup copy, the clone copy, or the disaster recovery copy, act 312. For example, the virtual machine backup appliance 222 restores the data set 220 to the first virtual machine 216 from either the backup copy stored via the second server 208, the clone copy stored via the third server 210, or the disaster recovery copy stored via the fourth server 212, depending on the availability and creation time of each copy. For example, the virtual machine backup appliance 222 may typically select to restore the data set 220 to the first virtual machine 216 from the backup copy stored via the second server 208. However, if the virtual machine backup appliance 222 determines that the backup copy stored via the second server 208 is corrupted, the virtual machine backup appliance 222 may select between the clone copy stored via the third server 210 and the disaster recovery copy stored via the fourth server 212, depending on the most recent creation time of each corresponding copy. Even if the virtual machine backup appliance 222 selects the clone copy stored via the third server 210 or the disaster recovery copy stored via the fourth server 212, a user requesting the recovery via the first client 202 participates in a single step recovery process, as the user does not have to request the separate loading of any storage medium used for long-term data retention, such as a tape storage. Furthermore, the virtual machine backup appliance 222 may restore the data set 220 to the first virtual machine 216 based on a file level data set, such as the selective restoration of specific files identified by the user via the first client 202, without the need to restore all of the other files remaining in the data set 220 to the first virtual machine 216.

Although FIG. 3 depicts the acts 302-312 occurring in a specific order, the acts 302-312 may occur in another order. Executing the flowchart 300 enables virtual machine backup that provides full enterprise level protection of data for all of an enterprise's virtual machines.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for virtual machine backup, the system comprising:
   one or more processors;
   a processor-based application stored on a non-transitory computer readable medium, which when executed on a computer, will cause the one or more processors to:
   create a backup copy of a data set associated with a virtual machine based on a backup schedule;
   create a clone copy of the backup copy based on a clone schedule; and
   store the clone copy on an external destination node comprising at least one of a disk and a tape.

2. The system of claim 1, wherein the processor-based application will further cause the one or more processors to:
   receive a request to restore the data set; and
   restore the data set based on one of the backup copy and the clone copy.

3. The system of claim 1, wherein the processor-based application will further cause the one or more processors to:
   create a disaster recovery copy of the backup copy and metadata associated with the backup copy based on a checkpoint at an interval;
   receive a request to restore the data set; and
   restore the data set based on the disaster recovery copy.

4. The system of claim 1, wherein the backup schedule and the clone schedule comprise a data protection policy.

5. The system of claim 1, wherein at least one of creating the backup copy of the data set comprises at least one of an internal proxy agent creating the backup copy of the data set and an external proxy agent creating the backup copy of the data set, and wherein creating the clone copy of the backup copy comprises at least one of the internal proxy agent creating the clone copy of the backup copy and the external proxy agent creating the clone copy of the backup copy.

6. The system of claim 1, wherein at least one of creating the backup copy of the data set comprises creating a deduplicated backup copy of the data set, and wherein creating the clone copy of the backup copy comprises creating a deduplicated clone copy of the backup copy.

7. The system of claim 1, wherein the data set comprises a file level data set.

8. A computer-implemented method for virtual machine backup, the method comprising:
   creating a backup copy of a data set associated with a virtual machine based on a backup schedule;
   creating a clone copy of the backup copy based on a clone schedule; and storing the clone copy on an external destination node comprising at least one of a disk and a tape.

9. The method of claim 8, wherein the method further comprises:
receiving a request to restore the data set; and
restoring the data set based on one of the backup copy and the clone copy.

10. The method of claim 8, wherein the method further comprises:
creating a disaster recovery copy of the backup copy and metadata associated with the backup copy based on a checkpoint at an interval;
receiving a request to restore the data set; and
restoring the data set based on the disaster recovery copy.

11. The method of claim 8, wherein the backup schedule and the clone schedule comprise a data protection policy.

12. The method of claim 8, wherein at least one of creating the backup copy of the data set comprises at least one of an internal proxy agent creating the backup copy of the data set and an external proxy agent creating the backup copy of the data set, and wherein creating the clone copy of the backup copy comprises at least one of the internal proxy agent creating the clone copy of the backup copy and the external proxy agent creating the clone copy of the backup copy.

13. The method of claim 8, wherein at least one of creating the backup copy of the data set comprises creating a deduplicated backup copy of the data set, and wherein creating the clone copy of the backup copy comprises creating a deduplicated clone copy of the backup copy.

14. The method of claim 8, wherein the data set comprises a file level data set.

15. A computer program product, comprising a non-transitory computer-readable medium having a computer-readable program code embodied therein, the computer-readable program code adapted to be executed by one or more processors to implement a method for virtual machine backup, the method comprising:
creating a backup copy of a data set associated with a virtual machine based on a backup schedule;
creating a clone copy of the backup copy based on a clone schedule; and
storing the clone copy on an external destination node comprising at least one of a disk and a tape.

16. The computer program product of claim 15, wherein the method further comprises:
receiving a request to restore the data set; and
restoring the data set based on one of the backup copy and the clone copy.

17. The computer program product of claim 15, wherein the method further comprises:
creating a disaster recovery copy of the backup copy and metadata associated with the backup copy based on a checkpoint at an interval;
receiving a request to restore the data set; and
restoring the data set based on the disaster recovery copy.

18. The computer program product of claim 15, wherein the backup schedule and the clone schedule comprise a data protection policy.

19. The computer program product of claim 15, wherein at least one of creating the backup copy of the data set comprises at least one of an internal proxy agent creating the backup copy of the data set and an external proxy agent creating the backup copy of the data set, and wherein creating the clone copy of the backup copy comprises at least one of the internal proxy agent creating the clone copy of the backup copy and the external proxy agent creating the clone copy of the backup copy.

20. The computer program product of claim 15, wherein at least one of creating the backup copy of the data set comprises creating a deduplicated backup copy of the data set, and wherein creating the clone copy of the backup copy comprises creating a deduplicated clone copy of the backup copy.

\* \* \* \* \*